2,869,988
Patented Jan. 20, 1959

2,869,988
ACTIVATION OF LIME

Gunter H. Gloss, Lake Bluff, Ill., assignor to International Minerals & Chemical Corporation, a corporation of New York No Drawing. Application November 15, 1955
Serial No. 547,038

4 Claims. (Cl. 23—186)

This invention concerns the preparation of alkaline earth hypochlorites, and more particularly, activation of alkaline earth hydroxides for the preparation of the corresponding hypochlorites.

Conventionally, calcium hypochlorite is prepared by chlorinating an aqueous suspension of calcium hydroxide, but it is well known that not all calcium hydroxide suspensions are suitable for this purpose. For example, dry by-product lime from various sources, such as, for example, acetylene generators, is substantially unreactive chemically and does not react with chlorine under ordinary chlorination conditions to produce any substantial amount of calcium hypochlorite. The inactivity of this by-product lime has long been recognized, as indicated by Ullmann, Enzyklopaedie der Technischen Chemie, vol. 5, p. 514, who states that by-product lime from acetylene production cannot be used for production of bleach solution.

High grade calcium hydroxide is relatively expensive, while by-product hydrated lime from acetylene generators is available at small cost. There has been a need for a simple method for activating by-product lime so that it could be chlorinated to calcium hypochlorite in high yields.

It is an object of this invention to provide a process for activating chemically inactive alkaline earth metal hydroxides.

Another object of this invention is to activate dry by-product lime from acetylene generators so that the lime can be chlorinated to produce calcium hypochlorite by conventional chlorination procedures.

Another object of this invention is to treat by-product lime from acetylene generators by a simple commercially feasible procedure to render it sufficiently chemically active so that it will react quantitatively with chlorine to produce calcium hypochlorite.

A further object of this invention is to provide a process for producing calcium hypochlorite from by-product lime from acetylene generators.

A further object of this invention is to provide a process whereby substantially all calcium hydroxide in by-product lime from acetylene generators is converted to calcium hypochlorite.

In accordance with this invention, an alkaline earth metal hydroxide, that is, calcium hydroxide, barium hydroxide or strontium hydroxide and magnesium hydroxide, which is substantially unreactive chemically and which is particularly unreactive toward chlorine is rendered substantially reactive chemically by treatment in accordance with a very simple procedure. According to a specific embodiment of this invention, calcium hydroxide which is unreactive chemically is converted to a highly reactive calcium hydroxide. Inactive calcium hydroxide, and preferably calcium hydroxide obtained from production of acetylene by treating calcium carbide with water or steam, which calcium hydroxide is substantially unreactive toward chlorine under conventional chlorination conditions, after heating in an aqueous slurry to a temperature of at least 50° C., in accordance with this invention reacts quantitatively with chlorine under conventional chlorination conditions to produce calcium hypochlorite. Inactive by-product lime from acetylene generators is completely activated by heating a slurry of this lime to at least 50° C., and preferably to a temperature of between about 70° C. and the boiling point of the aqueous slurry. Although it is not known what transformation takes place in the lime during the heating period, it is observed that by-product lime, which is substantially unreactive toward chlorine prior to heating, is rendered completely reactive by heating to at least 50° C. and will react quantitatively with chlorine to form calcium hypochlorite.

The heating step in the process of this invention may be carried out with or without agitation as desired. Activation of the lime is accelerated as the degree of agitation is increased, but agitation can be entirely dispensed with if desired.

The time necessary to completely reactivate by-product lime is dependent on the degree of agitation utilized and the initial inactivity of the lime employed. The complete activation of lime, however, can be obtained in the absence of agitation by simply heating an aqueous slurry of the lime to a temperature of at least 50° C. Heating such an aqueous slurry to the boiling point, however, results in the most complete activation of the lime and constitutes a preferred embodiment of this invention. External heating may be employed or the aqueous slurry of lime may be heated by passing live steam through the slurry. As shown by one of the following examples, the passage of steam through an aqueous slurry of lime results in complete activation of the lime in less than about five minutes, this time being necessary to raise the temperature of the aqueous slurry to above 50° C. Completeness of the activation can be readily determined by passing chlorine through a sample of the reaction product mixture and then determining the available chlorine in the treated slurry. The reaction between chlorine and the lime should be quantitative if activation is complete.

Chemically inactive lime or hydrated lime which may be completely activated in accordance with this invention may be obtained from any source but by-product lime from acetylene generators is preferred due to its availability and cheapness and because it is completely activated readily by this process. Waste lime from acetylene generators, wherein calcium carbide is reacted with water or steam to produce acetylene, is available in the form of a dry powder having the following approximate composition:

| | Percent |
|---|---|
| $Ca(OH)_2$ | 91.7 |
| $SiO_2$ | 1.89 |
| $Fe_2O_3$ | .30 |
| Carbon | .20 |
| $Al_2O_3$ | 1.46 |
| MgO | .35 |
| SiC | 0.19 |
| Heavy Metals (Pb) | 0.005 |
| $CO_2$ | 3.31 |
| $H_2O$ | 0.50 |

For the purposes of this invention chemically inactive lime is desirably admixed with water to form an aqueous slurry containing between about 5% and about 30% solids by weight. Preferably the slurry will contain between about 8% and about 12% solids by weight.

In accordance with a preferred embodiment of this invention dry by-product lime from an acetylene generator is mixed with sufficient water to form a 20% slurry and heated to a temperature of about 60° C. over a period of about eight minutes. The hot aqueous slurry is then cooled to about 22° C. and chlorinated by passing chlorine gas through the mixture in a maximum amount of about 1.1 grams per gram of calcium oxide in the slurry, preferably one gram of chlorine per gram of calcium oxide. The temperature during the chlorination reaction is kept below about 40° C. and the pH of the suspension is maintained above about 9.0. Analysis of the reaction product mixture for available chlorine indicates that the lime reacts quantitatively with the chlorine.

The following examples illustrate specific embodiments of this invention. All parts and percentages are by weight unless otherwise indicated.

EXAMPLES I, II, III, IV

Dry by-product lime from an acetylene generator and having an approximate analysis as shown above was slurried with water and heated as shown in Table 1. The quantities of lime and water and the conditions for heating are also indicated in Table 1. Following the heat treatment, the reaction product mixture was chlorinated by passing chlorine gas through the mixture. Table 1 shows the quantity of chlorine gas utilized and the period over which it was added. In each case the pH of the reaction mixture during chlorination was maintained above 9.0. In each example analysis of the reaction product mixture for available chlorine showed that the reaction between lime and chlorine was substantially quantitative. A control slurry of by-product lime, which was chlorinated without prior activation by heating, is shown by Table 1 to be almost unreactive toward chlorine as indicated by the available chlorine content of the reaction product mixture. By-product lime, which was activated by heating, reacted quantitatively with chlorine under conventional chlorination conditions. In all cases the temperature of the reaction mixture during chlorination was maintained at about room temperature.

Table 1

| Ex. | $Ca(OH)_2$, grams | Unheated | $Cl_2$ Added, grams | Addn. Time, Min. | Available Chlorine, g./l. | Total Volume Lime Slurry, ml. |
|---|---|---|---|---|---|---|
| I | 50 | Boiled for 1 hr. while agitating with air | 40 | 15 | 81.5 | 500 |
| II | 60 | Heat to 70° C. in 10 min. Cool to 22° C. | 40 | 15 | 76.1 | 550 |
| III | 50 | Heat to 50° C. in 8 minutes | 30 | 8 | 54.8 | 490 |
| IV | 100 | Introduce live steam for 5 minutes | 60 | 15 | 45.4 | 1400 |
| Control | 61 | Agitation with air while chlorinating | 35 | -------- | 5.5 | 500 |

Having now fully described and illustrated the character of the instant invention, what is desired to be secured by Letters Patent is:

1. A process wherein dry, by-product calcium hydroxide obtained in the production of acetylene by treating calcium carbide with water, which calcium hydroxide is substantially unreactive with chlorine when treated therewith in an aqueous slurry, is commingled with a slurrying and activating medium consisting of water to a solids level between about 5 and about 30% by weight, and the resulting slurry is heated to a temperature between about 50° C. and the boiling point thereof, whereby said calcium hydroxide is rendered highly reactive toward chlorine.

2. A process as in claim 1 wherein said slurry of said calcium hydroxide is heated to a temperature between about 70° C. and the boiling point of the slurry.

3. A process as in claim 1 wherein steam is passed into said slurry at a rate sufficient to raise the temperature of said slurry to above about 50° C. in less than about 5 minutes.

4. A process wherein dry, chemically inactive by-product lime from an acetylene generator is mixed with a sufficient quantity of water to form a slurry consisting of water and between about 8 and about 12% lime by weight, and said slurry of lime and water is boiled for about one hour while agitating with air, whereby the lime therein is rendered highly reactive toward chlorine.

References Cited in the file of this patent

UNITED STATES PATENTS

| | | |
|---|---|---|
| 1,381,106 | Charlton | June 14, 1921 |
| 1,377,401 | Crow et al. | May 10, 1921 |
| 1,916,592 | Weibezahn | July 4, 1933 |
| 2,061,332 | Rue et al. | Nov. 17, 1936 |
| 2,122,889 | Mues | July 5, 1938 |
| 2,173,912 | Mertes | Sept. 26, 1939 |
| 2,178,586 | Joachim | Nov. 7, 1939 |
| 2,213,131 | Wintersberger et al. | Aug. 27, 1940 |
| 2,320,635 | Mericola et al. | June 1, 1943 |
| 2,474,207 | Lovell et al. | June 28, 1949 |
| 2,560,016 | Walker | July 10, 1951 |
| 2,611,683 | Knibbs | Sept. 23, 1952 |
| 2,701,188 | Ritter et al. | Feb. 1, 1955 |
| 2,709,126 | Gollmar | May 24, 1955 |